US008660015B2

(12) United States Patent
Issakov et al.

(10) Patent No.: US 8,660,015 B2
(45) Date of Patent: Feb. 25, 2014

(54) LOCATION OF MOBILE DEVICES SERVED BY A RELAY NODE

(75) Inventors: Simon Issakov, Wayne, PA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 128 days.

(21) Appl. No.: 13/337,625

(22) Filed: Dec. 27, 2011

(65) Prior Publication Data

US 2013/0163440 A1    Jun. 27, 2013

(51) Int. Cl.
*H04W 24/00* (2009.01)

(52) U.S. Cl.
USPC ............................................. 370/246

(58) Field of Classification Search
USPC ............. 455/456.5, 67.11, 424, 404.2, 456.1, 455/515, 450; 370/252, 315, 241, 329
See application file for complete search history.

(56) References Cited

U.S. PATENT DOCUMENTS

| 4,728,959 | A  | 3/1988  | Maloney et al. |
| 5,327,144 | A  | 7/1994  | Stilp et al. |
| 5,608,410 | A  | 3/1997  | Stilp et al. |
| 6,047,192 | A  | 4/2000  | Maloney et al. |
| 6,108,555 | A  | 8/2000  | Maloney et al. |
| 6,388,618 | B1 | 5/2002  | Stilp et al. |
| 6,483,460 | B2 | 11/2002 | Stilp et al. |
| 6,546,256 | B1 | 4/2003  | Maloney et al. |
| 6,661,379 | B2 | 12/2003 | Stilp et al. |
| 6,765,531 | B2 | 7/2004  | Anderson |
| 6,782,264 | B2 | 8/2004  | Anderson |
| 6,950,664 | B2 * | 9/2005 | Chen et al. .................. 455/456.5 |
| 7,667,649 | B2 | 2/2010  | LeFever et al. |
| 7,783,299 | B2 | 8/2010  | Anderson et al. |
| 7,844,280 | B2 | 11/2010 | Anderson et al. |
| 7,924,224 | B2 | 4/2011  | LeFever et al. |
| 8,150,421 | B2 | 4/2012  | Ward |
| 2009/0143018 | A1 * | 6/2009 | Anderson et al. .......... 455/67.11 |
| 2010/0027521 | A1 | 2/2010 | Huber et al. |
| 2011/0053588 | A1 * | 3/2011 | Al-Khudairi et al. ......... 455/424 |
| 2011/0149774 | A1 * | 6/2011 | Chen et al. .................... 370/252 |
| 2011/0211467 | A1 * | 9/2011 | Bhat ............................. 370/252 |
| 2011/0222428 | A1 * | 9/2011 | Charbit et al. ................ 370/252 |
| 2012/0052835 | A1 * | 3/2012 | Bull et al. .................. 455/404.2 |

(Continued)

FOREIGN PATENT DOCUMENTS

WO    WO 2010/124031       10/2010
WO    WO2010124031 A2 *    10/2010    ............ H04W 84/04

OTHER PUBLICATIONS

U.S. Appl. No. 11/533,310, filed Sep. 19, 2006, Ward.
U.S. Appl. No. 11/948,244, filed Nov. 30, 2007, Anderson.

(Continued)

*Primary Examiner* — Asad Nawaz
*Assistant Examiner* — Parth Patel
(74) *Attorney, Agent, or Firm* — Baker & Hostetler LLP

(57) ABSTRACT

A network-based wireless location system (WLS) is configured to locate mobile devices, or user equipment (UE), wirelessly communicating with a relay node (RN). The RN is wirelessly backhauled to a serving donor enhanced NodeB (donor eNB), and the RN has eNB functionality to communicate with the UE and has UE functionality to communicate data from the UE with the donor eNB. The WLS carries out a method including receiving uplink transmissions from the RN, using the uplink transmissions from the RN to compute a location estimate for the RN, and determining a location estimate for the UE based on the location estimate for the RN.

29 Claims, 11 Drawing Sheets

(56) References Cited

U.S. PATENT DOCUMENTS

| | | | |
|---|---|---|---|
| 2012/0082087 A1* | 4/2012 | Takano | 370/315 |
| 2012/0099503 A1 | 4/2012 | Guo et al. | |
| 2012/0127890 A1 | 5/2012 | Islam | |
| 2012/0163287 A1* | 6/2012 | Raaf et al. | 370/315 |
| 2012/0165038 A1* | 6/2012 | Soma et al. | 455/456.1 |
| 2012/0178482 A1* | 7/2012 | Seo et al. | 455/501 |
| 2012/0178485 A1* | 7/2012 | Zeira et al. | 455/515 |
| 2012/0182874 A1* | 7/2012 | Siomina et al. | 370/241 |
| 2012/0213105 A1* | 8/2012 | Wigren et al. | 370/252 |
| 2012/0214512 A1* | 8/2012 | Siomina et al. | 455/456.2 |
| 2012/0327797 A1* | 12/2012 | Siomina et al. | 370/252 |
| 2013/0023286 A1* | 1/2013 | Soma et al. | 455/456.1 |
| 2013/0044700 A1* | 2/2013 | Cheng et al. | 370/329 |
| 2013/0051307 A1* | 2/2013 | Fan | 370/315 |
| 2013/0053048 A1* | 2/2013 | Garcia et al. | 455/450 |

OTHER PUBLICATIONS $3^{rd}$ Generation Partnership Program, "Evolved Universal Terrestrial Radio Access (E-UTRA)—Relay radio transmission and reception", 3GPP TR 36.826, V0.10.0, Release 11, Aug. 2011, 44 pages.

$3^{rd}$ Generation Partnership Program, "Evolved Universal Terrestrial Radio Access (E-UTRA) and Evolved Universal Terrestrial Radio Access Network (E-UTRAN) Overall Description", 3GPP TS 36.300, V10.5.0, Stage 2, Release 10, Sep. 2011, 194 pages.

$3^{rd}$ Generation Partnership Program, "Further Advancements for E-UTRA Physical Layer Aspects", 3GPP TR 36.814, V9.0.0, Release 9, Mar. 2010, 104 pages.

$3^{rd}$ Generation Partnership Program, "Positioning uncertainity and confidence for MDT", 3GPP TSG-RAN WG-2, Meeting #77bis, Mar. 26-30, 2012, 4 pages.

* cited by examiner

TYPE I

TYPE Ia

TYPE Ib

LOCATION OF MOBILE DEVICES SERVED BY A RELAY NODE

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to methods for obtaining a location estimate of a wireless device operating in the area served by a relay node using network-based techniques such as Time of Arrival (TOA), Time-difference-of-Arrival (TDOA), Signal Strength Measurement (SSM) and/or Angle of Arrival (AoA).

BACKGROUND

This application is related in subject matter to U.S. patent application Ser. No. 12/842,861, filed on Jul. 23, 2010, "Network-Based Location of Mobile Transmitters", the subject matter of which is hereby incorporated by reference in its entirety.

Early work relating to network-based Wireless Location Systems (WLS) is described in U.S. Pat. No. 4,728,959, "Direction Finding Localization System" (issued Mar. 1, 1998) which discloses a system for locating cellular telephones using angle of arrival (AOA) techniques and U.S. Pat. No. 5,327,144, (issued Jul. 5, 1994) "Cellular Telephone Location System," which discloses a system for locating cellular telephones using time difference of arrival (TDOA) techniques. Further enhancements of the system disclosed in the '144 patent are disclosed in U.S. Pat. No. 5,608,410, (issued Mar. 4, 1997), "System for Locating a Source of Bursty Transmissions". Location estimation techniques for wide-band wireless communications systems were further developed in U.S. Pat. No. 6,047,192 (issued Apr. 4, 200), "Robust, Efficient Localization System", U.S. Pat. No. 7,844,280, "Location of wideband OFDM transmitters with limited receiver bandwidth"; and Ser. No. 12/842,861, "Network-Based Location of Mobile Transmitters".

All of these patents are assigned to TruePosition, Inc., the assignee of the present invention. TruePosition has continued to develop significant enhancements to the original inventive concepts. First commercially deployed in 1998, overlay network-based wireless location systems have been widely deployed in support of location-based services including emergency services location.

A wireless location system's performance is normally expressed as one or more circular error probabilities with a defined yield. The United States Federal Communications Commission (FCC) as part of the 2001 Enhanced 9-1-1 Phase II mandate currently (in 2011) requires that network-based systems, such as U-TDOA, be deployed to yield a precision that generates a one-hundred meter (100 m or 328.1 feet) accuracy for a yield of 67% of emergency services callers and a three-hundred meter (300 m or 984.25 feet) accuracy for a yield of 95% of emergency services callers. In 2011, the FCC set a new single location accuracy requirement, to be implemented in 2019 (for any and all E911 location technologies) to 50 meters for 67% emergency services callers and 150 meters accuracy for 95% of emergency services callers. This legal requirement makes location accuracy (and yield) of paramount importance for wireless location systems. As realized and noted in extensive prior art, the ability to routinely, reliably, and rapidly locate cellular wireless communications devices has the potential to provide significant public benefit in public safety and convenience and in commercial productivity. Similar to the United States Enhanced Wireless 9-1-1 program, the European Commission's E-Call initiative seeks to provide location-facilitated emergency assistance to motorists.

The $3^{rd}$ Generation Partnership Program (3GPP) realizing that the Code Division Multiple Access (CDMA) based Universal Mobile Telephony System (UMTS) would fail to meet the International Telecommunications Union's (ITU) requirements for $4^{th}$ generation cellular communications (the "IMT-Advanced" specification), launched the Orthogonal frequency-division multiplexing (OFDM) based Long Term Evolution (LTE) project and then later the LTE-Advanced project (also OFDM-based).

As an evolution of EUTRAN (aka LTE), LTE-Advanced is quite complex, with dynamic channel bandwidths, different transmission schemes for the downlink and uplink, both frequency and time domain duplexing (FDD and TDD) transmission modes, and use of multiple-input-multiple-output (MIMO) antenna techniques for both the enhanced NodeB basestation as well as at the wireless device (User Equipment (UE)).

LTE-Advanced performance targets are defined in 3GPP TR 36.814, "Further Advancements for E-UTRA Physical Layer Aspects." Of the new features, the Enhanced uplink multiple access scheme, clustered SC-FDMA (N-times DFT-spread OFDM) will be used to increase the uplink (UE to eNB) data rate. Clustered SC-FDMA allows frequency selective scheduling within a component carrier for better throughput.

As part of the LTE and LTE-Advanced projects, "relay stations" were redefined from the well-known, simple analog signal repeaters to "relay nodes" (RN) that may adjust power control settings, use self-cancellation, decode the signal, correct errors and regenerate and then forward the received, relayed signal using another channel, modulation or frequency band.

Three RN deployment scenarios for 3GPP Release 10 are foreseen: a) outdoor relay; b) indoor relay c) thru-wall relay. These deployment scenarios are detailed in 3GPP Technical Report 36.826 V0.11.0; "Evolved Universal Terrestrial Radio Access (E-UTRA)-Relay radio transmission and reception". The technical report (TR) that includes the 3GPP LTE-Advanced Rely node and donor cell functionality is 3rd Generation Partnership Project; Technical Report 3GPP TR 36.814—"Further advancements for E-UTRA physical layer aspects"; (Release 9) in Sections 9 and 9A. The 3GPP technical specification 36.300 Evolved Universal Terrestrial Radio Access (E-UTRA) and Evolved Universal Terrestrial Radio Access Network (E-UTRAN) Overall description; Stage 2 (Release 10) details the interfaces for communications between Relay-eNB and Relay-UE in Section 4.7

Use of Relay Node in LTE-A allows for cell expansion, much like with traditional repeaters, and cooperative relaying where both the serving LTE-A Enhanced NodeB (eNodeB or simply eNB) radio base station and the relay node act to provide communications with the User Equipment (UE).

An eNB used with Relays is deemed a "Donor". Relays used for cell expansion are termed "Type-I" or "non-transparent". Cooperative Relays are termed "Type-II" or "transparent". A Type-I (non-transparent) relay rebroadcasts the control and reference signals provided by the donor eNB and relays bidirectional data between the donor eNB and the UE. A Type-II (transparent) relay does not rebroadcast the control and reference signals and serves to relay bidirectional data between the donor eNB and the UE as to provide transmission gain and multipath diversity on the radio communications link.

The 3GPP standards also allows relay support also for legacy LTE phones (a Type-I family relay node looks to a UE as regular LTE (Release 8) eNodeB while Type-II relays in use cannot be detected by UEs).

The LTE-A model discussed below is an exemplary but not exclusive environment in which the present invention may be used.

SUMMARY

A wireless device communicating with a relay node can be located by a network-based wireless location system (WLS) using the uplink transmissions from the mobile device and also uplink transmission from RN node. The RN node regenerates the UE transmit signal using different channel parameters.

In an illustrative embodiment, an inventive method is employed by a network-based wireless location system (WLS) to locate a mobile device, or user equipment (UE), wirelessly communicating with a relay node (RN). The RN is wirelessly backhauled to a serving donor enhanced NodeB (donor eNB), and has eNB functionality to communicate with the UE and has UE functionality to communicate data from the UE with the donor eNB. The inventive method of this illustrative embodiment comprises receiving uplink transmissions from the RN, using the uplink transmissions from the RN to compute a location estimate for the RN, determining a range value indicating a distance between the UE and the RN, and determining a location estimate for the UE based on the location estimate for the RN and the range value. It should be noted that an embodiment of the inventive method may perform a technique wherein the WLS locates the RN, uses the RN location to narrow the TDOA search range, and then applies a new correlation threshold in the narrow TDOA search range. With this technique, a second TDOA location from the LMUs is determined The narrowed search range serves to limit the possibility of false detections.

Similarly, an illustrative embodiment of a wireless location system (WLS) is disclosed herein. The illustrative embodiment comprises a plurality of geographically distributed location measuring units (LMUs), and at least one of a serving mobile location center (SMLC) or enhanced SMLC (eS-MLC) communicatively coupled to the plurality of LMUs. The WLS is configured to receive uplink transmissions from a RN; use the uplink transmissions from the RN to compute a location estimate for the RN, determine a range value indicating a distance between the UE and the RN, and determine a location estimate for the UE based on the location estimate for the RN and the range value.

The present invention may also be embodied in the form of computer readable media in which executable instructions (i.e., software) are recorded. For example, an embodiment of this type may include a computer readable medium comprising executable instructions that, when executed, cause a network-based wireless location system (WLS) to carry out a method as recited above, i.e., to locate the UE.

Other inventive features are described below and recited in the claims. For example, several of the inventive approaches for locating UE communicating with a Relay Node of different types involve the use of a modified matched replica process. Such approaches are described below and recited in the claims.

BRIEF DESCRIPTION OF THE DRAWINGS

The foregoing summary and the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
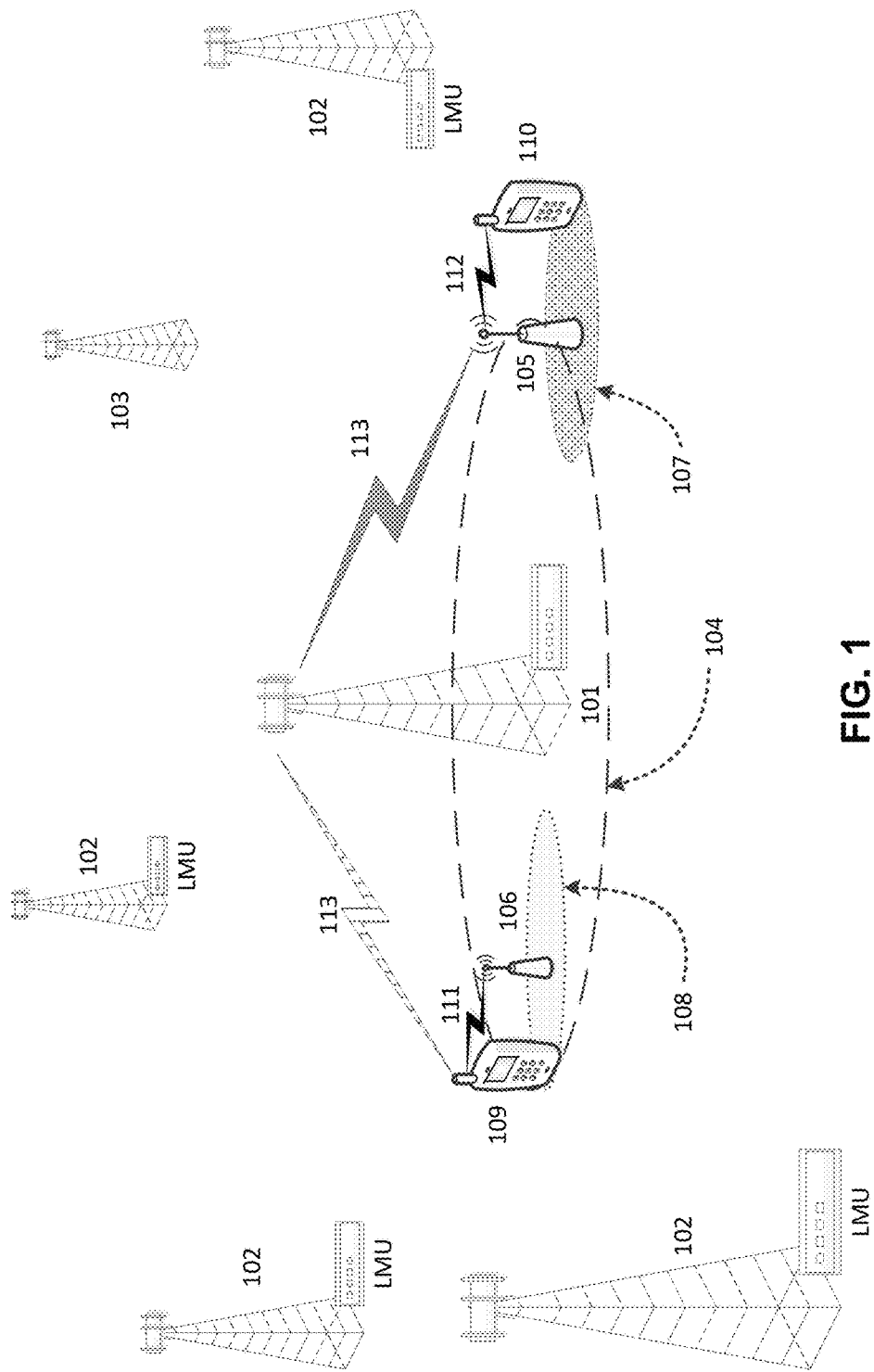
FIG. 1 schematically depicts a Wireless Location System deployed in a Long Term Evolution Advanced (LTE-A) wireless communications.

We will now describe illustrative embodiments of the present invention. First, we provide a detailed overview of the problem and then a more detailed description of our solutions. As will be seen, we describe below methods and systems for employing a wireless location system (WLS), e.g., of the network-based type including a network of geographically distributed LMUs, to locate a mobile device, which is also referred to herein as a UE.

In the description below, we describe inventive approaches concerning:

(A) location of UE served by a Type-I (non-Transparent) Relay Node;

(B) location of UE when TDOA is incomplete (this technique is a fallback for the relay node scenarios I, Ia, Ib, and II);

(C) location of UE served by a Type-Ia Relay Node;

(D) location of UE served by a Type-Ib Relay Node;

(E) location of UE served by a Type-II (Transparent) Relay Node; and (F) triggering events for location of UE served by a Relay Node. First, however, we will provide a bit more background on the challenges encountered in locating UE when Relay Nodes are employed.

Network-based Wireless Location Systems (WLS) use the uplink (UE to eNB) radio signal to locate the UE. The WLS consists of mobile location centers interconnected to a geographically distributed network of radio receivers nominally either co-located or integrated into the eNB. A WLS may use Time-of-Arrival (TOA), Time-Difference-of-Arrival (TDOA), Signal-Strength-Measurements (SSM), and/or Angle-of-Arrival (AoA) techniques to locate the UE using the uplink radio signal transmission. These location techniques, each used exclusively or in combination, may be hybridized other location techniques that use network or satellite downlink signals (e.g. Observed Time Difference of Arrival (OT-DOA), Global Navigation Satellite System (GNSS), or Assisted GNSS positioning). The term GNSS can include the Global Positioning System, the Galileo system, the GLONASS system, and the Beidou/Compass system among others.

One of the features new to the LTE/LTE-A radio air interface is the relay node (RN). The RN is used to increase capacity and fill-in coverage. The RN has limited base station (enhanced NodeB or eNB in LTE parlance) functionality to control and wirelessly communicate with a wireless device (also called a mobile device, a mobile, or user equipment (UE)). The RN is wirelessly backhauled to the serving donor eNB. Relay Nodes are envisioned by operators as a good deployment choice for areas where wired backhaul is unavailable or too expensive. Other deployment scenarios include temporary emplacements for one-time or special events.

The RN has some eNB functionality to communicate with the served UE and has UE functionality to communicate the data exchanged with the served UE with the donor eNB. Depending on the type, the RN can communicate with served UE over one frequency and with eNB over different or that can be done via same frequency (in-band (F1) and out-of-band (F2)).

Network-based location of a UE being served by a relay node (RN) is difficult due to the low power of the radio link between the UE and the RN. The low signal strength problem can be exacerbated by the deployment environments expected for relay nodes such as indoor (with surrounding signal attenuating structures) and on or beyond the nominal eNB cell coverage edge (with adjacent cell interference).

The relay nodes introduce another challenge for performing network-based positioning of the LTE UE as the UE-origination signal may be decoded and encoded again by the RN and then retransmitted possibly at a later time, at different frequency or in another frequency band.

Network-based wireless location systems do have some distinct advantages in locations of UEs served by relay node. Firstly, the network-based system can use near real-time processing techniques (see TruePosition U.S. Pat. No. 5,608,410 "System for locating a source of bursty transmissions cross reference to related Applications"; U.S. Pat. No. 6,047,192 "Robust Efficient Localization System"; U.S. Pat. No. 6,765,531 "System and Method for Interference Cancellation in a Location Calculation for use in a Wireless Location System"; U.S. Pat. No. 7,667,649 "Detection of time of arrival of CDMA signals in a wireless location system"; U.S. Pat. No. 7,924,224 "Variable Coherence Integration for the Location of Weak Signals" and U.S. Pat. No. 7,956,808 "Method for position estimation using generalized error distributions") to vastly increase the processing gain and thus can use weak signals, such as those transmitted between the UE and RN for location. Secondly, the geographic distribution of the WLS receivers allows for potentially lower path loss from UE and RN on the serving (donor) cell edge.

When a UE is operating in the service area of a Relay Node, both the UE uplink signaling and the RN uplink signaling become available to the network-based wireless location system. The WLS may use only the RN uplink transmissions to locate the RN (as if RN is another UE). Next step, the WLS may derive the range of UE from RN using the TA value or by estimating the time delay difference of RN signal and UE signal at LMU attached to donor eNB.

Alternatively, the WLS may attempt to measure both UE and RN uplink signal. Based on RN time measurement, the WLS may attempt to detect low power UE measurement signal by constraining the search space.

Hybrids

Location of UE's served by a relay node may include hybrid location techniques. Use of Angle-of-Arrival (AoA) with U-TDOA is likely given the use of multiple-antenna eNodeB's and beamforming used in LTE-A to raise system capacity.

FIG. 1

FIG. 1 illustrates network-based location of the mobile devices(s) (User Equipment or UE) served by a Relay Node (RN) and a donor eNobeB (DeNB). In this example illustration, the donor ENodeB (eNB) 101 has both a type-I and type-II LTE-A RN in a single-hop (UE-RN-DeNB) formation.

The donor eNodeB 101, shown in this example as a tower deployed macrocell, provides wireless service to devices within its service area 104. In geographic proximity to the donor cell 101 are LMU-equipped eNB 102. Also in geographic proximity are non-equipped eNB 103. The eNB 101 102 equipped with LMUs may have the LMU functionality integrated into the hardware and software of the eNodeB or may have an overlay LMU co-located in the cell site, sharing antenna, data communications, power and environmental services with the eNB 101 102.

In this example wireless communications network (WCN), the donor eNB 102 has a Type-I RN 105 deployed to expand cell coverage to a new service area 107. The donor eNB 101 also has a Type-II RN 106 deployed to provide coverage assistance in a DeNB service area 108.

A first mobile device (a UE in LTE and LTE-A) 110 is served by Type-I RN 105. The wireless communications link 112 provided by the Type-I RN 105 allows the UE 110 to operate with the wireless communications network via the RN 105 and wireless link 113 provided by the donor eNB 101.

A second UE 109 is served by the Type-II RN 106 with a service area 108 within the nominal service area 104 of the DeNB. Like the Type-I Radio Node system, the wireless communications link 111 provided by the Type-II RN 106 allows the UE 109 to operate with the wireless communications network via the RN 106 via the UE-to-RN link 111 and the RN-to-DeNB link 113. The DeNB may also receive and combine the uplink signaling originating from both the Type-II RN 106 and UE 109.

The network-based Wireless Location System (WLS) is shown in this illustration as the LMU equipped eNB 101 102. (See, e.g., U.S. Pat. No. 6,388,618, "Signal collection system for a wireless location system"; and U.S. Pat. No. 6,108,555, "Enhanced Time Difference Localization System," for illustrative details on the design and capabilities of the location sensor/receiver.) Core network components not currently standardized for LTE-Advanced such as the enhanced serving mobile location center (eSMLC) as well as ancillary location-based services (LBS) servers, administrative nodes and location gateways (Gateway Mobile Location Center (GMLC)) as well as associated interconnecting wired and wireless packet data links are not shown for the purposes of clarity.

FIG. 2

Figure 2:
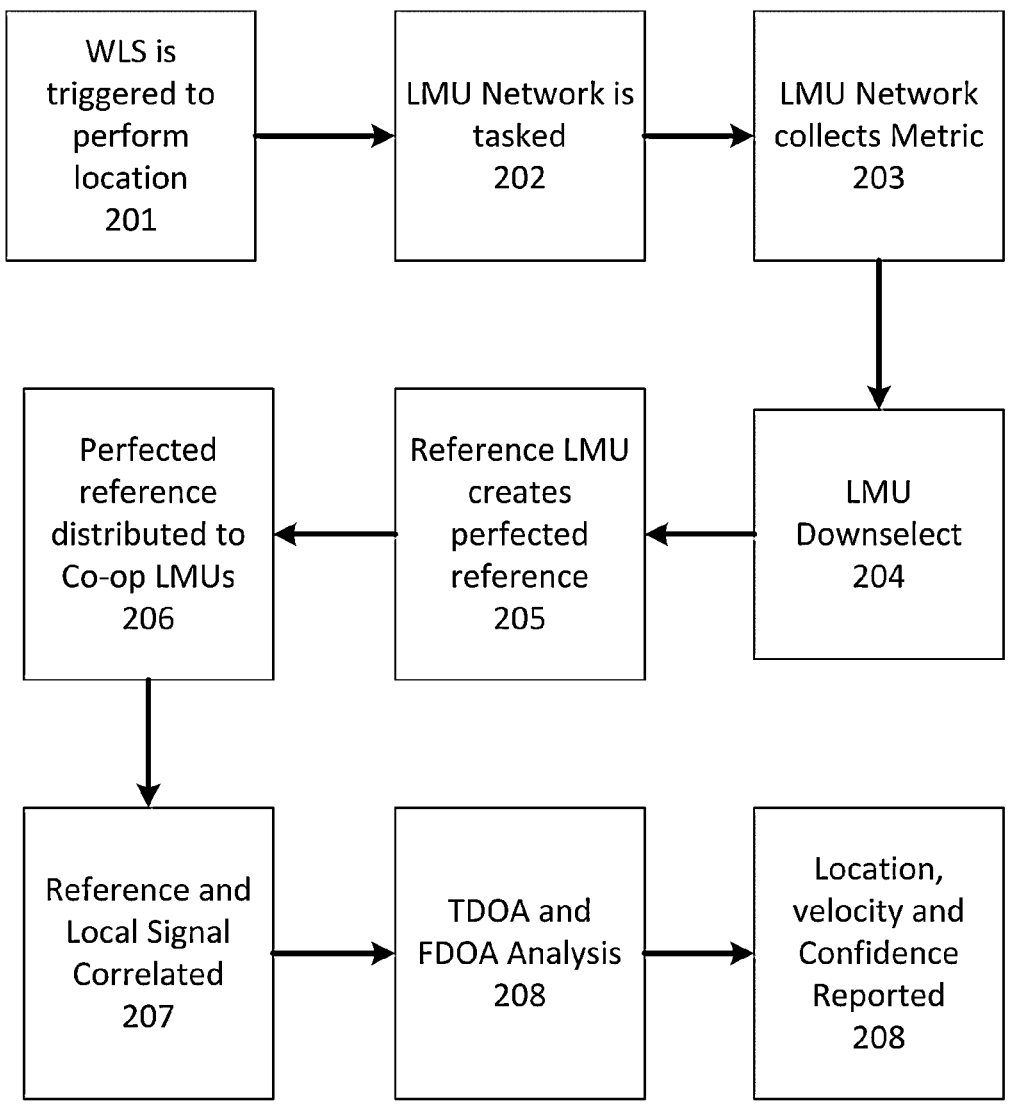
FIG. 2 depicts the U-TDOA mobile location procedure.

FIG. 2 summarizes the processing steps used in matched replica, station-based processing for location of a mobile not served by a Relay Node. Examples of steps 201 to 208 are illustrated in U.S. Pat. Nos. 5,327,144, "Cellular Telephone Location System"; 5,608,410, "System for locating a source of bursty transmissions cross reference to related applications"; 6,047,192, "Robust Efficient Localization System"; 6,483,460, "Baseline Selection Method for Use in a Wireless Location System"; and 6,661,379, "Antenna Selection Method for a Wireless Location System," all of which are incorporated by reference herein.

In step 201, the wireless location system (WLS) is triggered to perform a location. This trigger can be a message generated by the wireless communications network (WCN), internally by the wireless communication system or externally by a network monitoring application such as a Radio Network Monitor (RNM) or Link Monitoring System (LMS). The triggering event may be a single message, multiple exchanged messages, or series of messages containing the network and radio link parameters necessary for the SMLC to task the LMU network.

In step 202, the SMLC tasks the LMU network via the provisioned data links, the SMLC selected LMUs collect radio signal strength and quality information 203 for the LMU downselect in step 204 where only LMUs with favorable metrics are used in subsequent steps. Step 203 may also encompass a phase where the SMLC analyzes the LMU metrics and serving cell and sector to determine the optimal LMU cluster to minimize the Geometric Dilution of Precision for the location.

In step 205, the LMU with the best (as determined by the metric and analysis) radio signal is used to create a reference (also known as a replica) wherein the signal of interest is demodulated. The reference is then forwarded to all LMUs in the selected cluster in step 206.

At step 207, the reference signal is re-encoded and re-modulated in software and then correlated with the local signal. The local signal is shifted in frequency and time until a maximized correlation peak is produced. From the correlation peak a TDOA measurement between the reference and the local LMU is taken as well as an FDOA measurement.

A. Location of UE Served by a Type-I (Non-Transparent) Relay Node

Type-I relay nodes combine limited functions of a eNodeB with that of a conventional repeater. A Type-I relay transmits synchronization channels and reference symbols and possesses an LTE Physical Cell ID. The basic Type-I LTE relay provides half duplex with In-band (F1) retransmissions. The half-duplex scheme allows for necessary signal isolation between the Donor-RN and the RN-UE links via time-division scheduling.

FIG. 3

Figure 3:
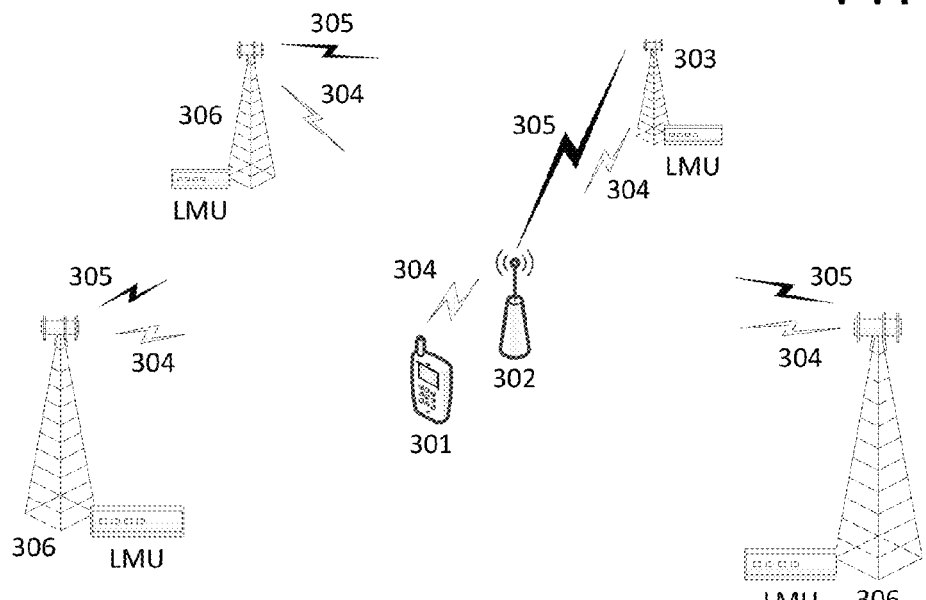
FIG. 3 geographically Depicts Location of a UE served by a Type-I relay node.

FIG. 3 geographically depicts the location of a UE being serviced by a Type-I RN using a network-based Wireless Location System. The UE 301 has a bi-directional radio link with the RN 302 having an uplink (UE-to-RN) component 304. The RN 302 has a bi-directional radio link with the eNB 203 having an uplink (RN-to-DeNB) 305 component. The two uplink transmissions 304 305 are related in that they are both clustered SC-FDMA transmissions in the same frequency band (inband) that are separated in time (half-duplex) through dynamic resource allocation by the RN.

The WLS uses it's geographically distributed network of receivers (Location Measurement Units), shown here co-located or integrated with the WCN cell tower's ENodeBs 303 306, to receive the uplink signaling 304 from the UE 301 and the uplink signaling 305 from the RN 302.

FIG. 4

Figure 4:
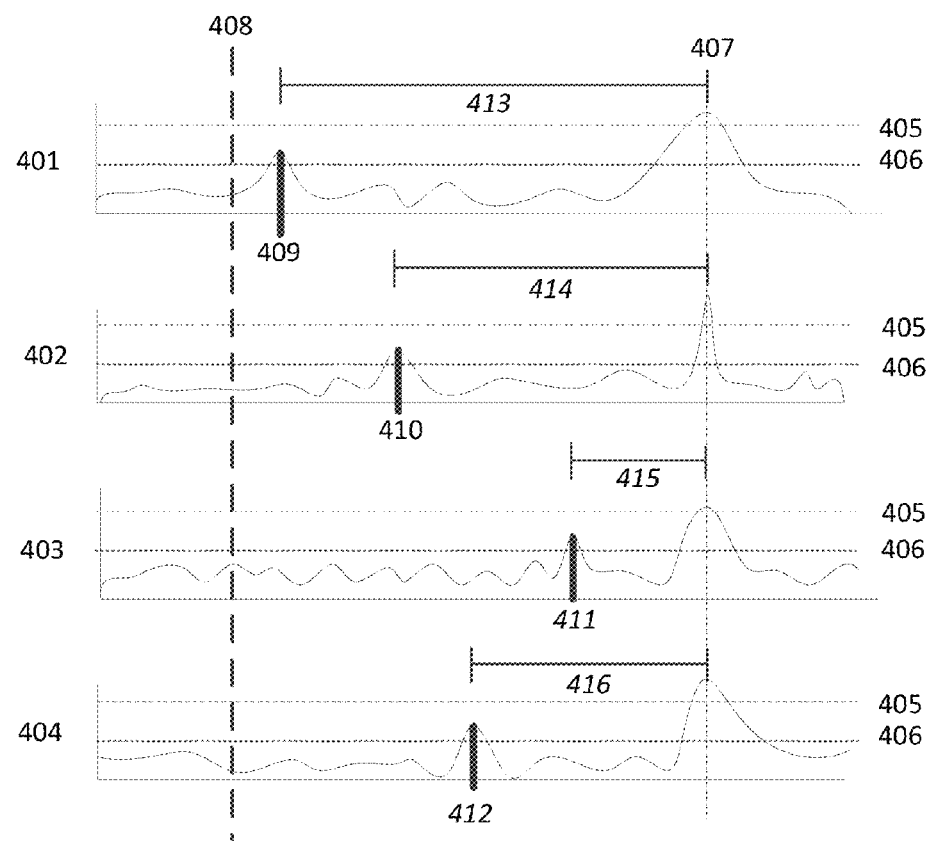
FIG. 4 shows the correlation signals used in locating a UE served by a Type-I relay node.

FIG. 4 details modifications to the core Matched Replica process to locate mobiles (UE's) served by a Type-I Relay Node. FIG. 4 depicts the correlation signal of the local signal with the reference signal in four correlation (Y-axis) versus time (X-axis) maps 401 402 403 404, one map for each of the different LMU receivers.

For the purposes of illustration only, the UE and RN uplink signals are shown using the same LTE-A channel in time multiplexed fashion. In practice, the Type-I RN may adjust power control settings, use self-cancellation, decode the signal, correct errors and regenerate and then forward the received, relayed UE uplink signal using another channel or modulation in a time-delayed fashion. With these parameters, the RN Type-I and UE correlation signals are more easily graphically depicted.

For each map 401 402 403 404, a detection threshold is set 405 designed to omit false positive detections for the matched replica processing used to locate the RN. Since the WLS, in most instances, will already have the RN location stored in a database (the database populated from the operator's Operational Support System (OSS), from radio survey data, from drive test data, or from past location calculations) this first location measurement serves to establish the time search window for location of the UE. In this example, the four reference signal map 401 402 403 404 are shown normalized on the highest correlation 407 for each correlation map. The time window can thus be shown as bounded by the times 407 and 408 with 408 being an estimate of the radio time of flight that includes the radius of the expected, known or predicted service area of the RN. Within the time window, a second measurement is performed with a second, lower detection threshold 406. The correlation peak 409 410 411 412 associated with the uplink signaling of the UE can then be determined and the time offsets 413 414 415 416 found so that a time-difference-of-arrival calculation may perform to locate the UE.

FIG. 5

Figure 5:
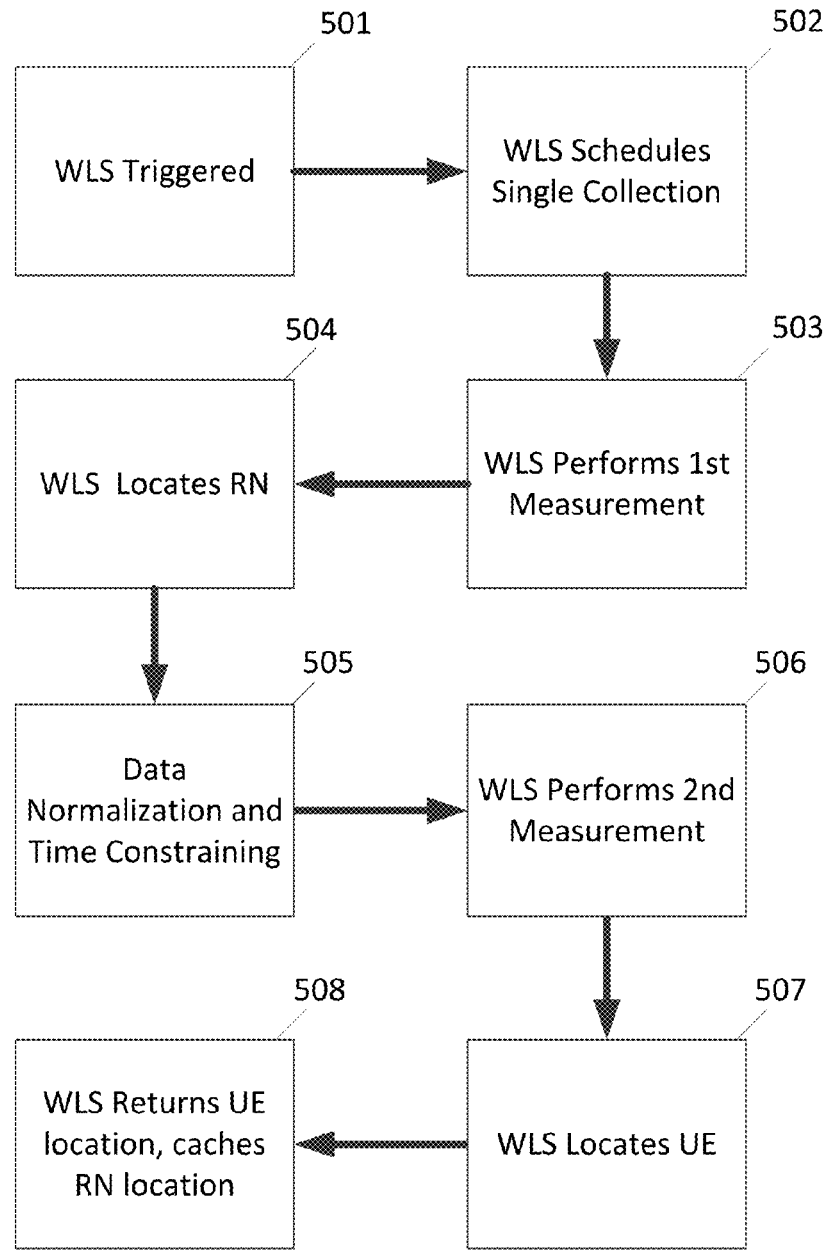
FIG. 5 procedurally illustrates the operations for locating a UE served by a Type-I relay node.

An example procedure for the location of a UE served by a Type-I RN is detailed in FIG. 5. The Wireless Location System (WLS) is triggered 501. The triggering information includes network and channel details known to the WCN (via the Donor eNB) useful to task the local LMUs (See U.S. patent application Ser. No. 12/842,861, "Network-Based Location of Mobile Transmitters" and U.S. Pat. No. 7,844,280, "Location of wideband OFDM transmitters with limited receiver bandwidth"). Alternately, a wireless or wired probe-based triggering platform may supply the needed tasking information (See U.S. Pat. No. 7,783,299; "Advanced triggers for location-based service applications in a wireless location system") or the UE and RN may use user-plane data messaging to provide tasking information (See U.S. patent application Ser. No. 11/533,310 "USER PLANE UPLINK TIME DIFFERENCE OF ARRIVAL (U-TDOA)").

With the RN type known (either from databased information available to the WLS or via real-time messaging from the triggering platform), the WLS schedules a single wide-band radio signal collection event 502. The single collection period may be extended from the time used to locate a non-relayed UE, since Type-I relays use separate half-duplex (time division) transmissions for the UE and RN in the same frequency band.

The WLS then performs a first measurement 503 using the matched replica process to determine the TDOA and FDOA values for signal received at the involved LMUs. From these measurements, the location of the Relay Node can be determined 504. The FDOA measurement may be used to verify that the signal is received from the stationary RN.

Once the Relay Node has been located, the WLS advances the correlation search timeframe forward to compensate for the time delay in relay node processing and forwarding and resets the detection threshold 505 as to locate the weaker UE transmitted uplink signal.

The WLS then performs a second measurement using the matched replica process to determine the TDOA and FDOA values for UE Uplink signal received at the involved LMUs 506. Repeated portions of the payload discovered in the first measurement may be used to amplify the correlation signal (See U.S. Pat. No. 6,546,256, "Robust Efficient Localization System").

From these measurements, the location of the UE can be determined 507. The FDOA value from the second measurement is used to provide a velocity (heading and speed) estimate for the UE.

The computed location information (e.g. location, location confidence factor, velocity and velocity error factor) for the RN and the UE are recorded by WLS and the subset of requested information sent to the requesting network entity 508.

B. Location of UE when TDOA is Incomplete

FIG. 6

Figure 6:
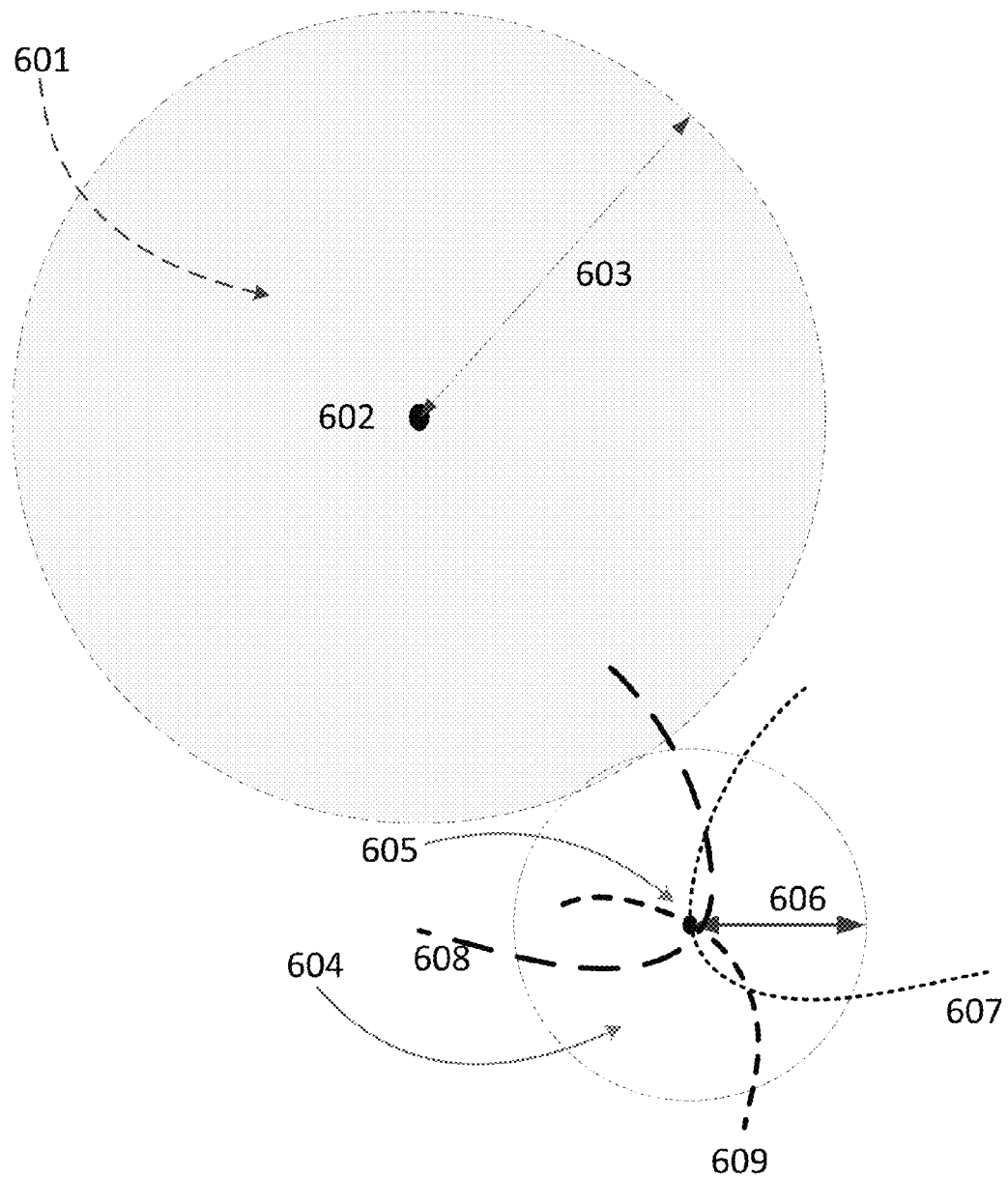
FIG. 6 geographically illustrates derivation of error estimates when the UE cannot be precisely located.

In some cases, due to the network topology or the intentionally weak or attenuated (e.g. by structures) UE signal may not be detectable by sufficient LMUs for a complete TDOA location. FIG. 6 depicts a donor eNodeB basestation and a relay node serving a UE. In this example, the UE signal cannot be detected at any LMUs. The DeNB 601 has a center 602 and serves an area with radius 603. An RN 604 serves an area with radius 606. The center of the RN service area 605 is verified by a TDOA calculation (shown here by the hyperbolic lines 607 608 609). Since the service area of the RN is known, the RN radius 606 may be used as a replacement for a calculated error estimate and the UE placed at the RN service area center 605, however; if even one LMU (nominally the LMU co-located with, or integrated into, the DeNB) can determine a time-offset from the RN, then that time offset may be used as the error estimate with the UE sited at the RN service area center 605. If available, the LTE timing advance of the UE may be substituted as the error estimate and the UE sited at the RN service area center 605.

It should be noted that, in LTE and LTE-A, the eNB controls timing advance for a non-relayed UE. For the type I RN, the Type-I RN would control the UE and set TA. The eNB has a second TA for the RN. For the Type-II RN, the eNB controls the timing and sets the TA for the RN.

C. Location of UE Served by a Type-Ia Relay Node

Type-Ia RN are sub-type of the Type-I RN that are full duplex and can thus transmit and receive at the same time using an out-of-band signal (F2) to provide the necessary signal isolation between the Donor-RN and the RN-UE links.

FIG. 7

Figure 7:
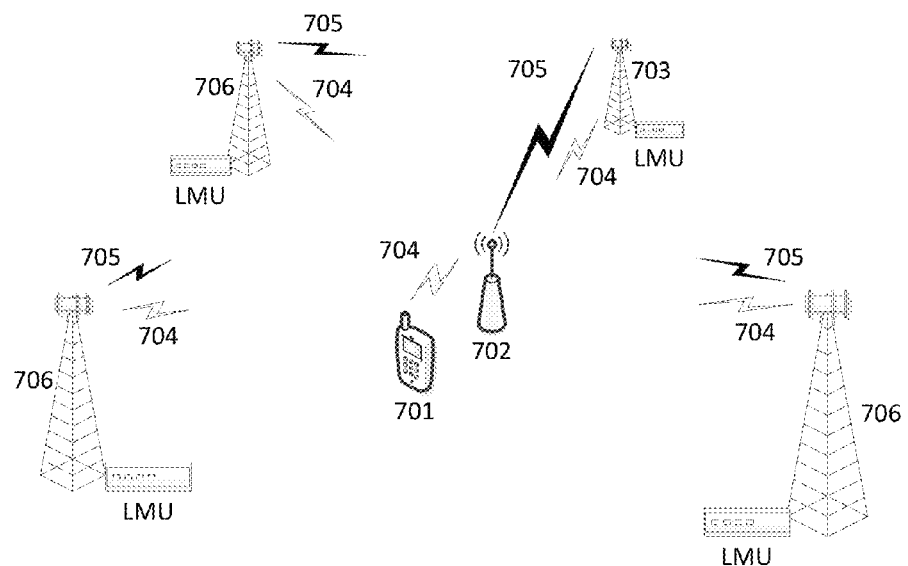
FIG. 7 geographically Depicts Location of a UE served by a Type-Ia relay node.

FIG. 7 geographically depicts the location of a UE being serviced by a Type Ia RN using a network-based Wireless Location System. The UE 701 has a bi-directional radio link with the RN 302 having an uplink (UE-to-RN) component 704. The RN 702 has a bi-directional radio link with the eNB 703 having an uplink (RN-to-DeNB) 705 component. The two uplink transmissions 704 705 are related in that they are both clustered SC-FDMA transmissions. Uplink transmissions 704 705 are separated by frequency band (out-of-band) allowing full duplex operation.

The WLS uses it's geographically distributed network of receivers (Location Measurement Units), shown here co-located or integrated with the WCN cell tower's ENodeBs 703 706, to receive the uplink signaling 704 from the UE 301 and the uplink signaling 705 from the RN 702.

FIG. 8

Figure 8:
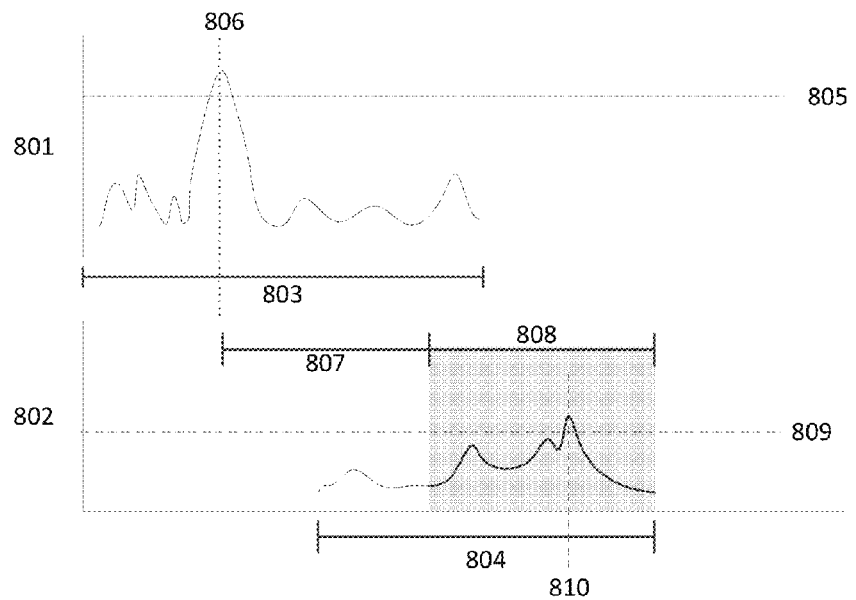
FIG. 8 shows the correlation signals used in locating a UE served by a Type-Ia relay node.

FIG. 8 details modifications to the core Matched Replica process to locate mobiles (UE's) served by a Type-Ia Relay Node. FIG. 8 depicts the two correlation (y-axis) versus time (x-axis) maps 801 802 for the correlation signal between a reference and co-operating LMU receiver. The first correlation map 801 refers to a first collection and measurement, while the second correlation map 802 refers to a second collection and measurement.

The Type-Ia RN node is a full duplex; out-of-band RN, so uplink signals from the UE and RN occur in the different frequency bands, necessitating two signal collection events in the case of LMUs limited to a single (or a subsection of a single) band. Map 801 shows the correlation signal and the detection threshold 805 for the Relay Node. Once the highest correlation 806 in the 1st search window 803 has been determined, a second search window 804 can be calculated from the time delay 807 associated with the RN and the possible radio time-of-flight 808 determined from the RN radius. A second correlation threshold is set 809 and the time associated highest correlation peak 810 within the second time window 810 noted. When sufficient LMUs perform this operation, a Time-difference-of-Arrival may be determined for both the Type-Ia RN and the UE.

FIG. 9

Figure 9:
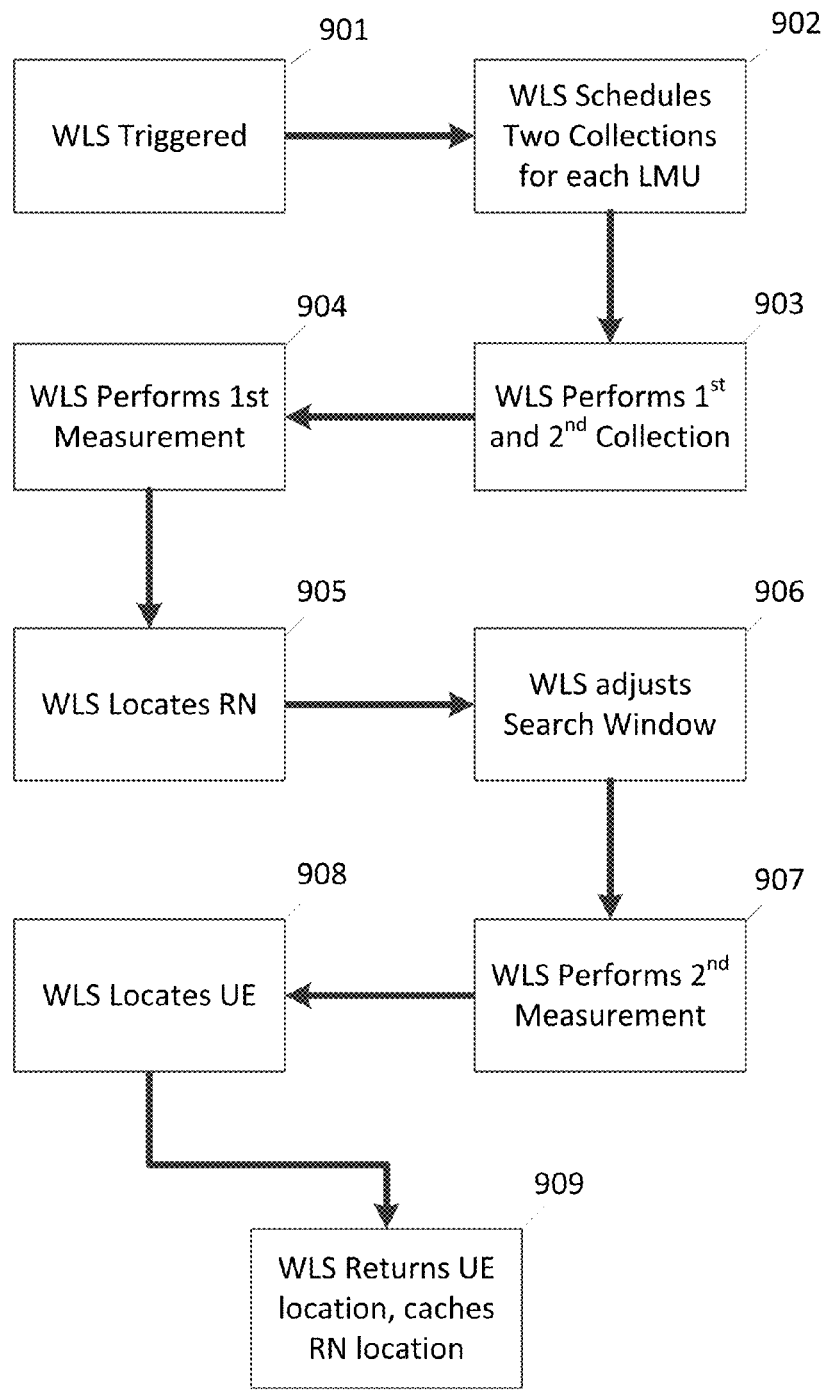
FIG. 9 procedurally illustrates the operations for locating a UE served by a Type-Ia relay node.

An example procedure for the location of a UE served by a Type-Ia RN is detailed in FIG. 9. The Wireless Location System (WLS) is triggered 901. The triggering information includes network and channel details known to the WCN (via the Donor eNB) useful to task the local LMUs.

With the RN type known (either from databased information available to the WLS or via real-time messaging from the triggering platform), the WLS schedules a two radio signal collection events for each LMU 902. The collection periods may be spaced to omit known static delays such as the RN processing and retransmission delay.

The WLS performs the first and second collections and stores the digitized wideband signal representations 903.

The WLS then performs a matched replica process to determine the TDOA and FDOA values for first collected signal received at the involved LMUs 904. From these measurements, the location of the Relay Node can be determined 905. The FDOA measurement can be used to verify that the signal is received from the stationary RN.

Once the Relay Node has been located, the WLS adjusts the search parameters, including the time window and detection threshold 906. The WLS then performs a second measurement 907 using the data from the second collection to determine the TDOA and FDOA values for UE Uplink signal received at the involved LMUs.

From the second collection and measurement, the location of the UE can be determined 908. The FDOA measurement is used to provide a velocity (heading and speed) estimate for the UE.

The computed location information (e.g. location, location confidence factor, velocity and velocity error factor) for the RN and the UE are recorded by WLS and the subset of requested information sent to the requesting network entity 909.

D. Location of UE Served by a Type-Ib Relay Node

Type-Ib RN are sub-type of the Type-I RN that are full duplex and can thus transmit and receive at the same time using an in-band signaling (F1) with antenna separation, directionality or shielding to provide the necessary signal isolation between the Donor-RN and the RN-UE links.

FIG. 10

Figure 10:
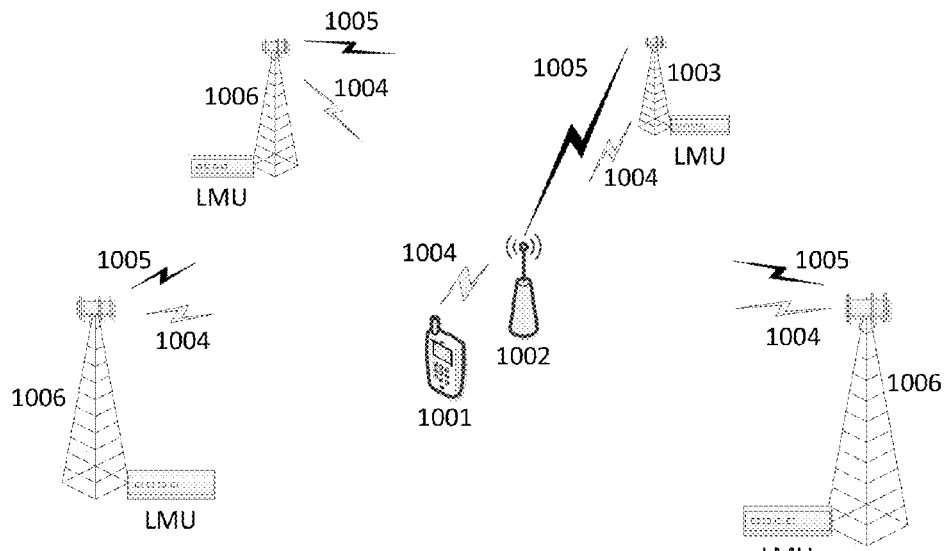
FIG. 10 geographically Depicts Location of a UE served by a Type-Ib relay node.

FIG. 10 geographically depicts the location of a UE being serviced by a Type Ib RN using a network-based Wireless Location System. The UE 1001 has a bi-directional radio link with the RN 1002 having an uplink (UE-to-RN) component 1004. The RN 1002 has a bi-directional radio link with the eNB 1003 having an uplink (RN-to-DeNB) 1005 component. The two uplink transmissions 1004 1005 are related in that they are both clustered SC-FDMA transmissions in the same frequency band (in-band). A Type-Ib RN uses multiple antennas with radio isolation or antenna directionality to operate in full-duplex mode.

The WLS uses it's geographically distributed network of receivers (Location Measurement Units), shown here co-located or integrated with the WCN cell tower's ENodeBs 1003 1006, to receive the uplink signaling 1004 from the UE 1001 and the uplink signaling 1005 from the RN 1002.

FIG. 11

Figure 11:
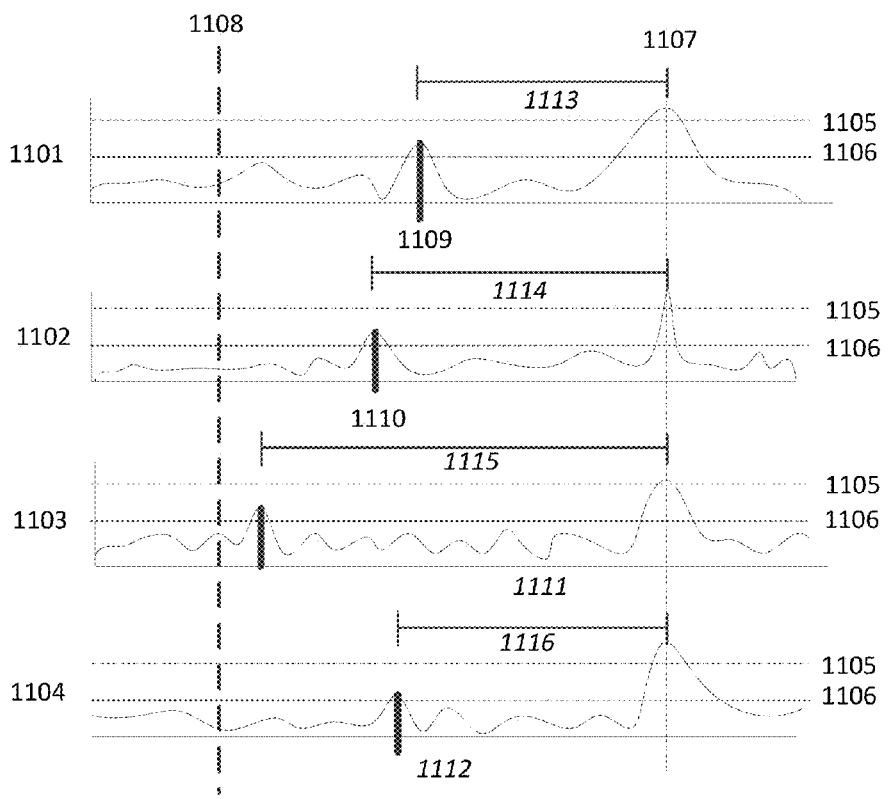
FIG. 11 shows the correlation signals used in locating a UE served by a Type-Ib relay node.

FIG. 11 details modifications to the core Matched Replica process to locate mobiles (UE's) served by a Type-Ib Relay Node. FIG. 11 depicts the correlation signal of the local signal with the reference signal in four correlation (Y-axis) versus time (X-axis) 1101 1102 1103 1104 for four different LMU receivers.

For the purposes of illustration only, the UE and RN uplink signals are shown using the same LTE-A channel in time multiplexed fashion. In practice, the Type-I RN may adjust power control settings, use self-cancellation, decode the signal, correct errors and regenerate and then forward the received, relayed UE uplink signal using another channel or modulation in a time-delayed fashion. With these parameters, the RN Type-Ib and UE correlation signals are more easily graphically depicted.

For each map 1101 1102 1103 1104, a detection threshold is set 1105 designed to omit false positive detections for the matched replica processing used to locate the RN. Since the WLS, in most instances, will already have the RN location stored in a database (the database populated from the operator's Operational Support System (OSS), from radio survey data, from drive test data, or from past location calculations) this first location measurement serves to establish the time search window for location of the UE. In this example, the four reference signal map 1101 1102 1103 1104 are shown normalized on the highest correlation 1107 for each correlation map. The time window can thus be shown as bounded by the times 1107 and 1108 with 1108 being an estimate of the radio time of flight that includes the radius of the expected, known or predicted service area of the RN. Within the time window, a second measurement is performed with a second, lower detection threshold 1106. The correlation peak 1109 1110 1111 1112 associated with the uplink signaling of the UE can then be determined and the time offsets 1113 1114 1115 1116 found so that a time-difference-of-arrival calculation may perform to locate the UE.

FIG. 12

Figure 12:
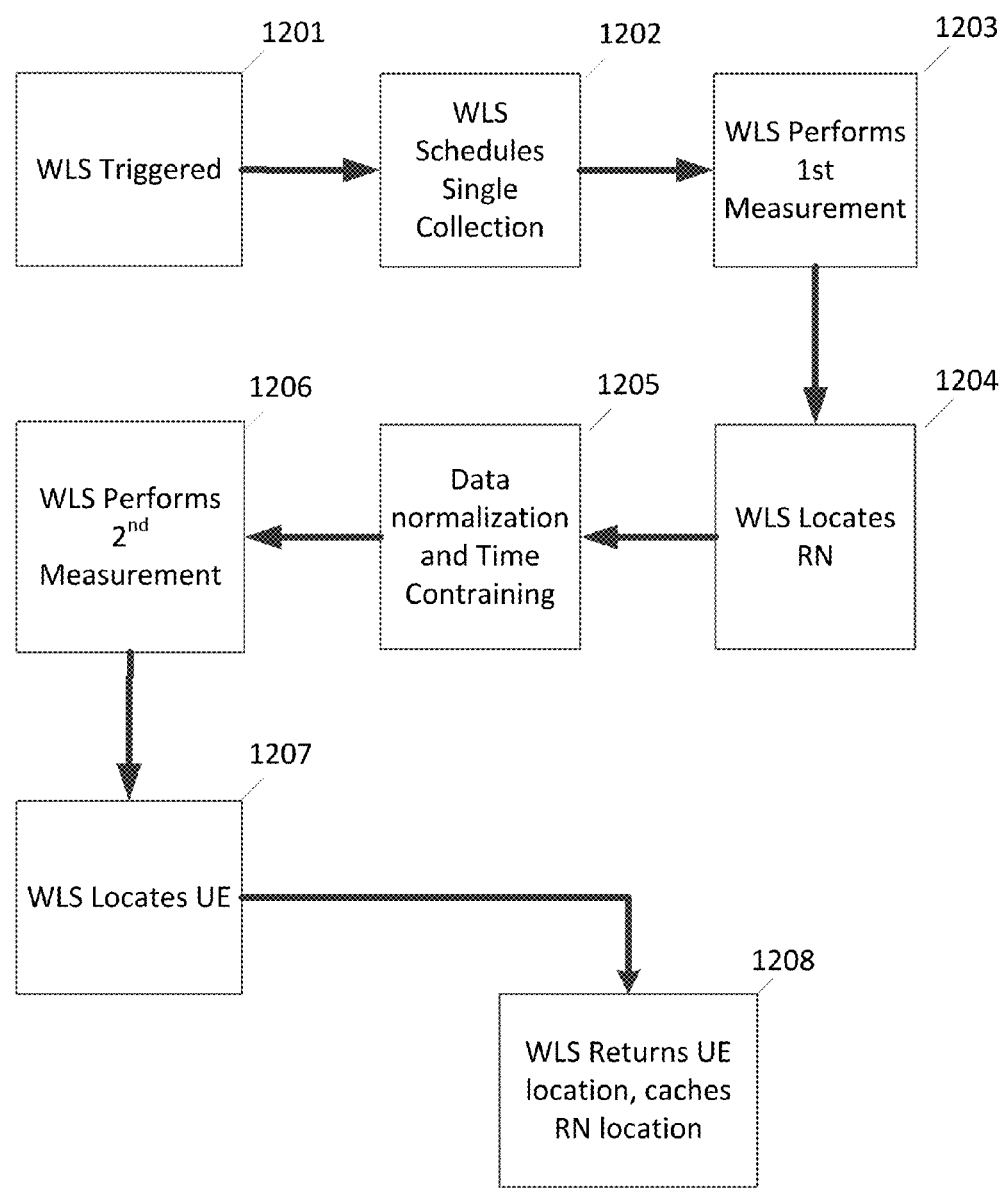
FIG. 12 procedurally illustrates the operations for locating a UE served by a Type-Ib relay node.

An example procedure for the location of a UE served by a Type-Ib RN is detailed in FIG. 12. The Wireless Location System (WLS) is triggered 1201. The triggering information includes network and channel details known to the WCN useful to task the local LMUs.

With the RN Type-Ib known (either from databased information available to the WLS or via real-time messaging from the triggering platform), the WLS schedules a single wideband radio signal collection event 1202. The single collection period may be extended since Type-Ib relays use separate in-band transmissions for the UE and RN in the same frequency band slightly time-delayed by the RN processing and retransmission delays.

The WLS then performs a first measurement using the matched replica process to determine the TDOA and FDOA values for the RN uplink signal received at the involved LMUs 1203. From these measurements, the location of the Relay Node can be determined 1204. The FDOA measurement can be used to verify that the signal is received from the stationary RN.

Once the Relay Node has been located, the WLS advances the correlation search timeframe forward to compensate for the time delay in relay node processing and forwarding 1205. The WLS then performs a second measurement 1206 using the matched replica process to determine the TDOA and FDOA values for the UE uplink signal received at the involved LMUs.

From these measurements, the location of the UE can be determined 1207. The FDOA measurement is used to provide a velocity (heading and speed) estimate for the UE. The computed location information (e.g. location, location confidence factor, velocity and velocity error factor) for the RN and the UE are recorded by WLS and the subset of requested information sent to the requesting network entity 1208.

E. Location of UE Served by a Type-II (Transparent) Relay Node

Type-II RNs do not possess a cell identity and appear to the UE as the donor eNB, thus the designation "transparent". Control information is exchanged between the donor eNB and the UE while data streams are exchanged between both the eNB and the Type II RN.

The solution is to use the Type-II relay node uplink transmissions to the serving eNB to perform UTDOA and locate the RN location and assume UE is close. Use RN Timing advance to define the UE uncertainty area.

Figure 13:
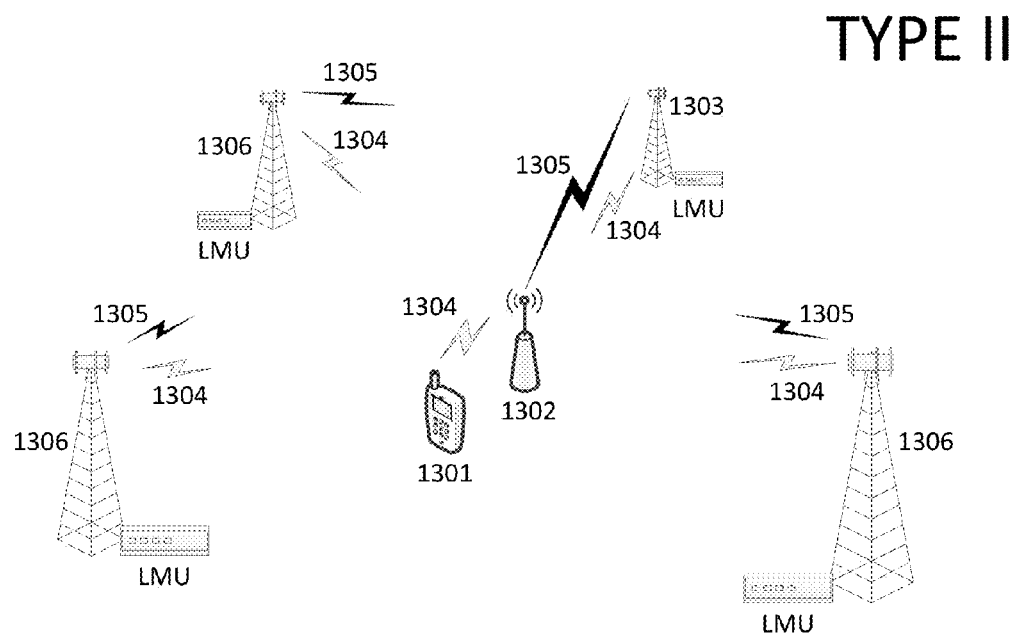
FIG. 13 geographically Depicts Location of a UE served by a Type-II relay node.

FIG. 13 geographically depicts the location of a UE being serviced by a Type II RN using a network-based Wireless Location System. The UE 1301 has a bi-directional radio link with the RN 1302 having an uplink (UE-to-RN) component 1304. The RN 1302 has a bi-directional radio link with the eNB 1303 having an uplink (RN-to-DeNB) 1305 component. The two uplink transmissions 1304 1305 are related in that they are both clustered SC-FDMA transmissions in the same frequency band (in-band) running in duplex mode under control of the donor ENodeB. In the case of a Type-II relay, the re-transmission 1305 of the original UE uplink signal 1304 is a true copy so that the DeNB 1303 receives two copies 1304 1305, identical except for the attenuation, interference and multi-path corruption. The identical nature allows the DeNB to treat the early arriving UE uplink signal 1304 as a multi-path component of the stronger RN uplink signal 1305.

The WLS uses it's geographically distributed network of receivers (Location Measurement Units), shown here co-located or integrated with the WCN cell tower's ENodeBs 1303 1306, to receive the uplink signaling 1304 from the UE 1301 and the uplink signaling 1305 from the RN 1302.

Figure 14A:
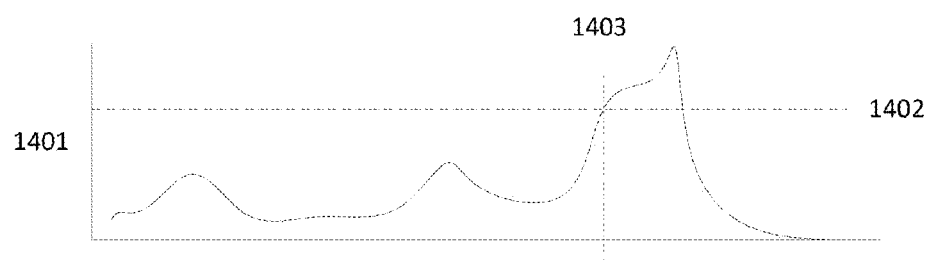
FIG. 14A shows the correlation signals used in locating a UE served by a Type-II relay node.
Figure 14B:
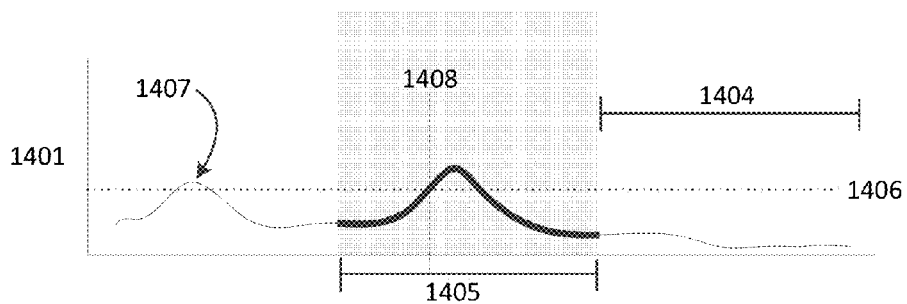
FIG. 14B shows the correlation signals used in locating a UE served by a Type-II relay node.

FIGS. 14A and 14B are used to depict modifications to the core Matched Replica process to locate mobiles (UE's) served by a Type-II Relay Node. FIGS. 14A and 14B depicts the two correlation (y-axis) versus time (x-axis) maps 1401

1402 for the correlation signal between a reference and co-operating LMU receiver. The first correlation map 1401 refers to a first single collection and first measurement, while the second correlation map 1402 refers to a first single collection and second measurement.

FIG. 14A

As shown in FIG. 14A Time/Correlation map 1401 is the result of a first correlation between matched replica signals from the reference LMU (nominally the LMU associated with the DeNB) and a geographically proximate, cooperative LMU. A detection threshold 1402 is set and the time stamp for the leading edge 1403 above threshold of the highest correlation peak is noted.

FIG. 14B

The second measurement of the first collection is shown in FIG. 14B. Based on the timestamp determined from the leading edge 1403 of the RN uplink signal correlation signal from FIG. 14A, a time window 1405 can be calculated. The timespan of the time window 1405 is determined from the RN uplink leading edge 1403 and a guard time determined from the maximum time-of-flight for a UE served by the RN Type-II. A second detection threshold is set 1406 to detect the weaker UE uplink signal. Correlation peaks 1407 outside the search window 1405 are ignored. To assist in UE signal detection, the correlation peak associated with the RN retransmission can be canceled before the second measurement. The correlation signal peak's leading edge 1408 that is within the time window 1405 is noted. When sufficient LMUs perform this operation, a Time-difference-of-Arrival may be determined from the respective timestamps for both the Type-II RN and the UE.

FIG. 15

Figure 15:
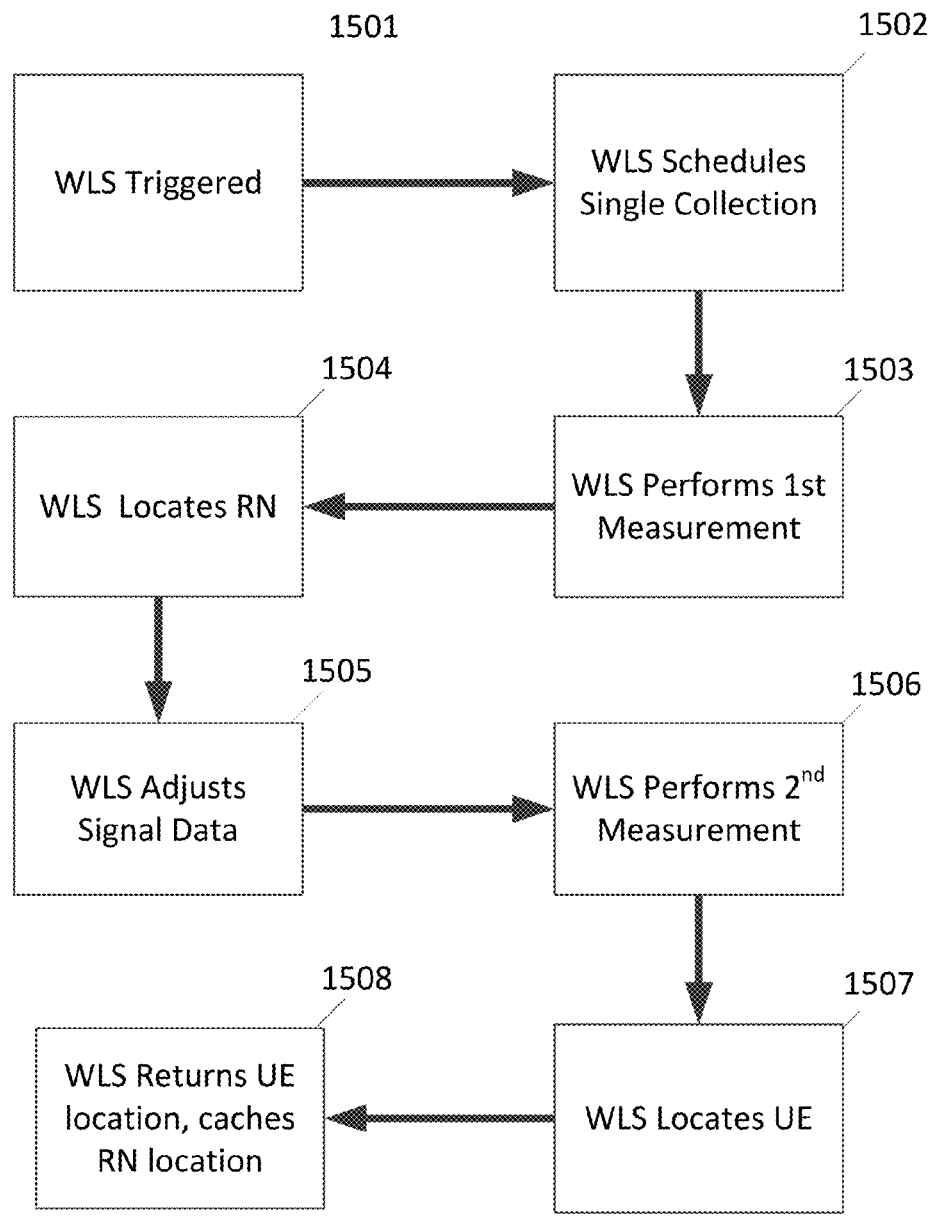
FIG. 15 procedurally illustrates the operations for locating a UE served by a Type-II relay node.

An example procedure for the location of a UE served by a type-II RN is detailed in FIG. 15. The Wireless Location System (WLS) is triggered 1501. The triggering information includes network and channel details known to the WCN (via the Donor eNB) useful to task the local LMUs (see U.S. patent application Ser. No. 12/842,861, "Network-Based Location of Mobile Transmitters," for tasking information). Alternatively, a wireless or wired probe-based triggering platform may supply the needed tasking information or the UE and RN may use user-plane data messaging to provide tasking information (see U.S. patent application Ser. No. 11/533,310 "User Plane Uplink Time Difference Of Arrival (U-TDOA)").

With the RN type known (either from databased information available to the WLS or via real-time messaging from the triggering platform), the WLS schedules a single radio signal collection event 1502. The single collection period may be extended since Type-II relays use separate transmissions for the UE and RN in the same frequency band, the UE uplink transmission and the RN uplink re-transmission time-delayed by the RN reception and re-transmission latency.

The WLS then performs a first measurement 1503 using matched replica process to determine the TDOA and FDOA values for signal received at the involved LMUs. From the multiple LMU measurements, the location of the Relay Node can be determined 1504. The FDOA measurement can be used to verify that the signal is received from the stationary RN.

Once the Relay Node has been located, the WLS advances the correlation search window timeframe forward to compensate for the time delay in relay node processing and forwarding 1505. Optionally, the WLS may treat the RN signal as interference and either cancel or subtract the RN correlation signal before detection of the UE correlation signal. (see U.S. Pat. No. 6,765,531 "System and method for interference cancellation in a location calculation, for use in a wireless location system" for an example of this cancellation operation).

The WLS then performs a second matched replica process to determine the TDOA and FDOA values for UE Uplink signal received at the involved LMUs 1506. A lower correlation threshold is established to locate the weaker UE transmitted uplink signal.

From the second measurement, the location of the UE can be determined 1507. The FDOA measurement is used to provide a velocity (heading and speed) estimate for the UE.

The computed location information (e.g. location, location confidence factor, velocity and velocity error factor) for the RN and the UE are recorded by WLS and the subset of requested information sent to the requesting network entity 1508.

F. Triggering Events for Location of UE Served by a Relay Node

The WLS is tasked to locate the UE. Tasking information may come from the wireless communications network or via probe system (see U.S. Pat. No. 6,782,264 "Monitoring of call information in a wireless location system" and No. 7,783,299, "Advanced triggers for location-based service applications in a wireless location system" issued for more information on passive wired and wireless link monitors). As defined in 3GPP Technical Specification 23.401 (Release 10), multiple triggering events are available. Since the RN appears to be a type of UE to the donor eNB, the RN node performs an attach to eNB (Section 4.3.20). This attach can be used to trigger the WLS to locate the RN by the transmitted uplink (RN-to-eNB) signals. 3GPP TS 23.401 also details how the donor eNB can activate/deactivate/modify the RN node, generating additional triggers, uplink radio signals for location and information for the database of RN identities, types and locations.

Once RN node is attached to donor eNB (DeNB), every time UE registers and perform a call via RN over Uu interface, the RN will resend everything over Un interface (RN-DeNB). Repetition of signals (or user data payloads) on the Uu and Un interfaces can be used by probe system to detect a RN in operation. Both the Uu and Un radio signals may be used by the Wireless location system for location calculation. Once RN is registered at DeNB any trigger from UE to RN is also repeated over Un interface and we can use it.

Network-based triggers on the Uu or Un interfaces can be any or all of those described in the prior art (e.g. call establishment (origination or termination), UE attached/detach from RN, or periodic location update) for voice, packet data or short-message-service (SMS).

G. Alternative Embodiments

Pre-Location of Relay Nodes by Uplink and or Downlink Signaling

TruePosition U.S. patent application Ser. No. 11/948,244 "Automated Configuration of a Wireless Location System" uses the downlink receiver of an LMU to locate base stations (e.g. radio base stations, access points, NodeBs, eNodeBs) by their repeated broadcast signals. The locations and the over-the-air identifiers associated with the base stations are then stored in a database for use in configuring the Wireless Location System and to assist in the calculation of location of mobile stations served by the base station(s). While Relay Nodes (RN) may or may not transmit a broadcast signal, the uplink signal from the RN to the donor eNodeB can be used to locate the RN. Once the RN location is known, the RN location can be used as an approximate location for the UE. This approximate location can be used as a seed value for location calculation. (See TruePosition U.S. patent application Ser. No. 12/970,594 "Position Estimation Through Iterative Inclusion of Measurement Data" as an example of location calculation using an approximate location to seed a higher accuracy location calculation.)

UE Location in a Multiple RN Hop Scenario

In LTE networks, relay nodes (RN) may be deployed in a single-hop (UE-RN-DeNB) configuration or in a multi-hop (e.g. UE-RN1-RN2-DeNB). In the case of multi-hop, the RN1 and RN2 uplink signals may be used to locate the respective RN and the UE-RN2 signaling (if detectable) may be used to locate the UE.

H. Conclusion

The true scope the present invention is not limited to the specific embodiments disclosed herein. For example, the foregoing disclosure of illustrative embodiments of a wireless location system and associated wireless communications system uses explanatory terms, such as LMU, eNodeB, eSMLC, LTE, SC-FDMA, and the like, that refer to structures, protocols and technical standards which represent exemplary, and in some cases presently preferred, implementations of the inventive concepts described herein, but these are by no means intended to limit the invention. The deployment scenarios described herein represent examples given the known preferences of network designers and operators. For instance, the LMU or eSMLC may be deployed as separate devices or incorporated into the hardware and software of the wireless communications network. Accordingly, except as they may be expressly so limited, the scope of protection of the following claims is not intended to be limited to the specific embodiments described above.

We claim:

1. A method for use by a network-based wireless location system (WLS) to locate a mobile device, or user equipment (UE), wirelessly communicating with a relay node (RN), wherein the RN is wirelessly backhauled to a serving donor enhanced NodeB (donor eNB), wherein the RN has eNB functionality to communicate with the UE and has UE functionality to communicate data from the UE with the donor eNB, and wherein during operation a donor eNB-to-RN signaling link and a RN-to-UE signaling link are established, the method comprising: receiving uplink transmissions from the RN; using the uplink transmissions from the RN to compute a location estimate for the RN; determining a range value indicating a distance between the UE and the RN; and determining a location estimate for the UE based on the location estimate for the RN and the range value; wherein the RN is configured to rebroadcast control and reference signals provided by the donor eNB and to relay bidirectional data between the donor eNB and the UE, and wherein the RN is further configured to transmit synchronization channels and reference symbols and possess a cell identification (LTE Physical Cell ID); provide half-duplex with in-band (F1) retransmissions; and provide signal isolation between the donor eNB-to-RN signaling link and the RN-to-UE signaling link via time-division scheduling.

2. A method as recited in claim 1, wherein the range value is determined using a timing advance (TA) value.

3. A method as recited in claim 2, further comprising receiving an uplink transmission from the UE at a location measuring unit (LMU) attached to the donor eNB, wherein the range value is determined by estimating a time delay difference between reception of the uplink transmission from the RN and reception of the uplink transmission from the UE at the LMU attached to the donor eNB.

4. A method as recited in claim 1, further comprising receiving uplink transmissions from the UE at multiple location measuring units (LMUs), and estimating the location of the UE by performing a time difference of arrival (TDOA) computation using a constrained search space.

5. A method as recited in claim 1, wherein the RN is configured to regenerate UE transmissions using different channel parameters.

6. A method as recited in claim 1, wherein the RN comprises a Type-I relay.

7. A method as recited in claim 1, wherein uplink transmissions from the UE and RN are clustered single channel frequency division multiple access (SC-FDMA) transmissions in the same frequency band and are separated in time through dynamic resource allocation by the RN, and wherein the method further comprises receiving the uplink transmissions from the UE and RN at a plurality of geographically distributed location measuring units (LMUs).

8. A method as recited in claim 7, wherein the method further comprises the use of a modified matched replica process to locate the UE.

9. A method as recited in claim 8, wherein the modified matched replica process comprises: for each of the plurality of LMUs, determining a correlation versus time map; for each correlation versus time map, setting a first detection threshold; identifying a first correlation peak in each correlation versus time map; establishing a time search window based on a predetermined location of the RN and information concerning a service area of the RN; within the time search window, using a second, lower detection threshold to identify a second correlation peak in each correlation versus time map; determining a time offset between the first and second correlation peaks in each correlation versus time map; and performing a time difference of arrival (TDOA) computation using the time offsets.

10. A method as recited in claim 8, further comprising: receiving triggering information including network and channel details useful to task the plurality of LMUs; scheduling a wide-band radio signal collection event;
performing a first measurement using the modified matched replica process to determine time difference of arrival (TDOA) and frequency difference of arrival (FDOA) values for transmissions received at the plurality of LMUs, wherein a first detection threshold and a first correlation search window are employed in the first measurement; determining a location estimate for the RN using the TDOA values; verifying that the RN is stationary using the FDOA values; advancing the correlation search window and resetting the detection threshold to a lower value; performing a second measurement using the modified matched replica process to determine the TDOA and FDOA values for UE transmissions received at the plurality of LMUs; determining a location estimate for the UE using the TDOA values from the second measurement; and determining a velocity estimate for the UE using the FDOA values from the second measurement.

11. A method as recited in claim 10, wherein the second measurement includes use of repeated portions of payload discovered in the first measurement to amplify the correlation signal.

12. A method as recited in claim 1, further comprising: determining that the UE uplink transmission is not detectable by sufficient number of location measuring units (LMUs) for a complete time difference of arrival (TDOA) location; and determining the range value indicating a distance between the UE and the RN based on a service area of the RN is known, wherein the location estimate for the UE is placed at the RN service area center.

13. A method as recited in claim 6, wherein the RN comprises a Type-Ia relay configured to transmit and receive at the same time using an out-of-band signal (F2) to provide signal isolation between the donor eNB-to-RN signaling link and the RN-to-UE signaling link.

14. A method as recited in claim 13, wherein the method further comprises receiving the uplink transmissions from the UE and uplink transmissions from the RN at a plurality of geographically distributed location measuring units (LMUs); wherein the method further comprises the use of a modified matched replica process to locate the UE; and wherein the modified matched replica process comprises: determining first and second correlation versus time maps for a correlation signal between a reference and co-operating LMU, wherein the first correlation versus time map refers to a first collection and measurement process for transmissions from the RN and the second correlation versus time map refers to a second collection and measurement process for transmissions from the UE; for the first correlation versus time map, setting a first detection threshold; identifying a first correlation peak in a first search window in the first correlation versus time map; determining a second search window based on a time delay associated with the RN; within the second search window, using a second, lower detection threshold to identify a second correlation peak in the second correlation versus time map; and performing a time difference of arrival (TDOA) computation to determine a location estimate for both the RN and the UE.

15. A method as recited in claim 13, further comprising: receiving triggering information including network and channel details useful to task the plurality of LMUs; scheduling and performing first and second radio signal collection events for each of the plurality of LMUs; performing a first measurement using a modified matched replica process to determine time difference of arrival (TDOA) and frequency difference of arrival (FDOA) values for transmissions received at the plurality of LMUs from the RN, wherein a first detection threshold and a first correlation search window are employed in the first measurement; determining a location estimate for the RN using the TDOA values; verifying that the RN is stationary using the FDOA values; adjusting the correlation search window to compensate for time delay in RN processing and forwarding, and resetting the detection threshold to a lower value for detection of weaker UE transmissions; performing a second measurement using the modified matched replica process to determine TDOA and FDOA values for UE transmissions received at the plurality of LMUs; and determining a location estimate for the UE using the TDOA values.

16. A method as recited in claim 6, wherein the RN comprises a Type-Ib relay configured to transmit and receive at the same time using in-band signaling (F1) with antenna separation, directionality or shielding to provide signal isolation between the donor eNB-to-RN signaling link and the RN-to-UE signaling link.

17. A method as recited in claim 16, wherein uplink transmissions from the UE and RN are clustered single channel frequency division multiple access (SC-FDMA) transmissions in the same frequency band; and wherein the method further comprises receiving the uplink transmissions from the UE and RN at a plurality of geographically distributed location measuring units (LMUs).

18. A method as recited in claim 17, wherein the method further comprises the use of a modified matched replica process to locate the UE, wherein the modified matched replica process comprises: for each of the plurality of LMUs, determining a correlation versus time map; for each correlation versus time map, setting a first detection threshold; identifying a first correlation peak in each correlation versus time map; establishing a time search window based on a predetermined location of the RN and information concerning a service area of the RN; within the time search window, using a second, lower detection threshold to identify a second correlation peak in each correlation versus time map; determining a time offset between the first and second correlation peaks in each correlation versus time map; and performing a time difference of arrival (TDOA) computation using the time offsets.

19. A method as recited in claim 17, further comprising: receiving triggering information including network and channel details useful to task the plurality of LMUs; scheduling a wide-band radio signal collection event; performing a first measurement using the modified matched replica process to determine time difference of arrival (TDOA) and frequency difference of arrival (FDOA) values for transmissions received at the plurality of LMUs, wherein a first detection threshold and a first correlation search window are employed in the first measurement; determining a location estimate for the RN using the TDOA values; verifying that the RN is stationary using the FDOA values; advancing the correlation search window and resetting the detection threshold to a lower value; performing a second measurement using the modified matched replica process to determine the TDOA and FDOA values for UE transmissions received at the plurality of LMUs; determining a location estimate for the UE using the TDOA values from the second measurement; and determining a velocity estimate for the UE using the FDOA values from the second measurement.

20. A method as recited in claim 1, wherein the RN comprises a Type-II relay configured not to rebroadcast control and reference signals but to relay bidirectional data between the donor eNB and the UE; wherein the RN lacks a cell identity and appears to the UE as the donor eNB; and wherein the method further comprises using RN uplink transmissions to the donor eNB to determine the RN location, assuming UE is close to the RN.

21. A method as recited in claim 20, wherein uplink transmissions from the UE and RN are clustered single channel frequency division multiple access (SC-FDMA) transmissions in the same frequency band; wherein the method further comprises receiving the uplink transmissions from the UE and RN at a plurality of geographically distributed location measuring units (LMUs); wherein the method further comprises the use of a modified matched replica process to locate the UE.

22. A method as recited in claim 21, wherein the modified matched replica process comprises: determining first and second correlation versus time maps for a correlation signal between a reference and co-operating LMU, wherein the first correlation versus time map refers to a first collection and measurement process for transmissions from the RN and the second correlation versus time map refers to a second collection and measurement process for transmissions from the UE; for the first correlation versus time map, setting a first detection threshold; identifying a first correlation peak in a first search window in the first correlation versus time map; determining a second search window based on a time delay associated with the RN; within the second search window, using a second, lower detection threshold to identify a second correlation peak in the second correlation versus time map; and performing a time difference of arrival (TDOA) computation to determine a location estimate for both the RN and the UE.

23. A method as recited in claim 22, further comprising, to assist in UE signal detection, canceling a correlation peak associated with RN retransmission before identifying the second correlation peak in the second correlation versus time map.

24. A method as recited in claim 21, further comprising: receiving triggering information including network and channel details useful to task the plurality of LMUs; scheduling and performing a first radio signal collection event for each of the plurality of LMUs; performing a first measurement using the modified matched replica process to determine time difference of arrival (TDOA) and frequency difference of arrival (FDOA) values for transmissions received at the plurality of LMUs from the RN, wherein a first detection threshold and a first correlation search window are employed in the first measurement; determining a location estimate for the RN using the TDOA values; verifying that the RN is stationary using the FDOA values; adjusting the correlation search window to compensate for time delay in RN processing and forwarding, and resetting the detection threshold to a lower value for detection of weaker UE transmissions; performing a second measurement using the modified matched replica process to determine TDOA and FDOA values for UE transmissions received at the plurality of LMUs; and determining a location estimate for the UE using the TDOA values.

25. A method as recited in claim 24, further comprising canceling the RN transmission as interference or subtracting the RN correlation signal before detection of the UE correlation signal.

26. A method as recited in claim 1, further comprising receiving triggering information useful to task the plurality of LMUs, wherein the triggering information is provided from at least one of a wireless communications network (WCN) associated with the WLS and a probe system associated with the WLS.

27. A method as recited in claim 26, wherein the triggering information is provided in response to the RN performing an attach to the donor eNB.

28. A wireless location system (WLS) configured to locate a mobile device, or user equipment (UE), wirelessly communicating with a relay node (RN), wherein the RN is wirelessly backhauled to a serving donor enhanced NodeB (donor eNB), wherein the RN has eNB functionality to communicate with the UE and has UE functionality to communicate data from the UE with the donor eNB, and wherein during operation a donor eNB-to-RN signaling link and a RN-to-UE signaling link are established, comprising: a plurality of geographically distributed location measuring units (LMUs); and at least one of a serving mobile location center (SMLC) or enhanced SMLC (eSMLC) communicatively coupled to said plurality of LMUs; wherein the WLS is configured for receiving uplink transmissions from the RN; using the uplink transmissions from the RN to compute a location estimate for the RN; determining a range value indicating a distance between the UE and the RN; and determining a location estimate for the UE based on the location estimate for the RN and the range value; wherein the RN is configured to rebroadcast control and reference signals provided by the donor eNB and to relay bidirectional data between the donor eNB and the UE, and wherein the RN is further configured to transmit synchronization channels and reference symbols and possess a cell identification (LTE Physical Cell ID); provide half-duplex with in-band (F1) retransmissions; and provide signal isolation between the donor eNB-to-RN signaling link and the RN-to-UE signaling link via time-division scheduling.

29. A non-transitory computer readable medium comprising executable instructions that, when executed, cause a network-based wireless location system (WLS) to carry out a method to locate a mobile device, or user equipment (UE), wirelessly communicating with a relay node (RN), wherein the RN is wirelessly backhauled to a serving donor enhanced NodeB (donor eNB), wherein the RN has eNB functionality to communicate with the UE and has UE functionality to communicate data from the UE with the donor eNB, and wherein during operation a donor eNB-to-RN signaling link and a RN-to-UE signaling link are established, the method comprising: receiving uplink transmissions from the RN; using the uplink transmissions from the RN to compute a location estimate for the RN; determining a range value indicating a distance between the UE and the RN; and determining a location estimate for the UE based on the location estimate for the RN and the range value; wherein the RN is configured to rebroadcast control and reference signals provided by the donor eNB and to relay bidirectional data between the donor eNB and the UE, and wherein the RN is further configured to transmit synchronization channels and reference symbols and possess a cell identification (LTE Physical Cell ID); provide half-duplex with in-band (F1) retransmissions; and provide signal isolation between the donor eNB-to-RN signaling link and the RN-to-UE signaling link via time-division scheduling.

* * * * *